United States Patent [19]

Deans et al.

[11] Patent Number: 5,393,435
[45] Date of Patent: Feb. 28, 1995

[54] REMOVAL OF ORGANIC CONTAMINANTS FROM AQUEOUS MEDIA

[75] Inventors: John R. Deans, Redmond, Wash.; George E. Heinsohn, Elkton, Md.; Bernard A. Link, Wilmington, Del.

[73] Assignee: Vanson L.P., Redmond, Wash.

[21] Appl. No.: 121,144

[22] Filed: Sep. 17, 1993

[51] Int. Cl.⁶ .............................................. C02F 1/56
[52] U.S. Cl. ...................................... 210/714; 210/727; 210/728; 210/730
[58] Field of Search .............. 210/666, 667, 714, 716, 210/725, 727, 728, 730

[56] References Cited

U.S. PATENT DOCUMENTS

| | | | |
|---|---|---|---|
| 3,350,304 | 10/1967 | Bacon | 210/730 |
| 3,533,940 | 10/1970 | Peniston et al. | 210/728 |
| 3,909,406 | 9/1975 | Lang | 210/716 |
| 4,200,548 | 4/1980 | Sunden et al. | 252/135 |
| 5,204,452 | 4/1993 | Dingilian et al. | 210/730 |
| 5,221,435 | 6/1993 | Smith | 162/164.1 |
| 5,269,939 | 12/1993 | Laurent et al. | 210/730 |

FOREIGN PATENT DOCUMENTS

| | | |
|---|---|---|
| 3016700 | 1/1991 | Japan . |
| 3090000 | 4/1991 | Japan . |
| WO90/02708 | 3/1990 | WIPO .............. 210/730 |

*Primary Examiner*—Peter A. Hruskoci

[57] ABSTRACT

Process and composition for treating aqueous media to remove impurities using chitosan, polysilicic acid and/or poly aluminosilicate, ferric compound and clay.

6 Claims, No Drawings

REMOVAL OF ORGANIC CONTAMINANTS FROM AQUEOUS MEDIA

BACKGROUND OF THE INVENTION

1. Field of the Invention

This invention relates to treatment methods and compositions for removing contaminants from aqueous media.

2. Description of Related Art

Japanese Patents J03090000, J03016700 and J03031538 disclose the use of chitosan, along with other ingredients, to dehydrate sewage sludge. J03016700 discloses the use of ferric chloride in combination with chitosan to dehydrate sewage sludge.

U.S. Patent application Ser. No. 08/121,143, filed Sep. 17, 1993, now abandoned discloses the removal of turbidity as measured by total suspended solids (TSS) from water using a flocculating composition comprising CSN and a ferric compound.

SUMMARY OF THE INVENTION

The present invention relates flocculating compositions comprising chitosan, and polysilic acid and/or polyaluminum silicate to remove from aqueous media of organics, phosphates, metal ions and suspended solids to decrease chemical oxygen demand (COD), biological oxygen demand (BOD) and improve the clarity of the aqueous media. The compositions are useful to minimize the environmental harm of aqueous effluents and to purify water for drinking, often rendering it potable.

DESCRIPTION OF THE INVENTION

In accordance with the present invention there is provided water treatment flocculating compositions, the process for treating the water to remove contaminants, and the water/flocculating composition mixtures that significantly purify water.

The treatment flocculating compositions comprise a ferric compound, chitosan (CSN), and one or both of polysilicic acid (PSA) and poly aluminosilicate (PAS). Significant amounts of a ferric compound and clay are also desirable for many applications. The composition may also contain an anionic polymer. These compositions are useful to remove organics, phosphates, heavy metal ions and suspended solids contaminants from aqueous media to lower the chemical and biological oxygen demands (BOD) and total suspended solids (TSS). The removal of TSS decreases turbidity, improving the clarity of treated aqueous media. The removal of phosphate greatly diminishes the environmental impact of the treated effluent upon discharge to natural waters.

In treating aqueous media to remove organics and solids, the flocculating composition is added to the contaminated water. A flocculate is formed that is removed from the aqueous media. The flocculate comprises ferric compound, CSN, PSA and/or PAS, organics and suspended solids (SS) (if present in the initial aqueous media). It also contains clay if it was contained in the flocculating composition.

The treatment of the contaminated aqueous stream with these flocculating compositions apparently involves both physical entrapment and reaction with contaminants The contaminants become tightly bound to the flocculating composition, which forms a floc that can be removed by conventional mechanical means, such as filtration or centrifuging, to give significantly purified water.

This process is particularly useful for removing blood from food processing waste water; decreasing the COD, BOD and TSS of sewage before secondary treatment; and purifying drinking water. It is also effective in treating sewage sludge prior to dewatering.

CSN may be used most conveniently in the form of a soluble salt of CSN. CSN of any level of acetylation can be used, providing it is sufficiently deacetylated to dissolve in a dilute acid. The molecular weight of the CSN is not critical so long as CSN solutions encountered in the present process are not too viscous for easy handling.

The ferric compound may be any inorganic water soluble compound that yields ferric ions when dissolved in the aqueous media to be treated. Because of excellent performance, ready availability, and low cost, ferric chloride is preferred.

The organics in the contaminated aqueous media to be treated can be in solution or in suspension. Often organic contaminants are present in the media both in solution and as suspended solids. Typical organics to be removed are blood, sewage waste organics, starches and proteins. Typical solids include insoluble proteins, starches, biomass and siliceous minerals.

In sewage waste treatment the organic load of an aqueous media is defined in terms of the oxygen requirement (usually in secondary treatment to oxidize the organic) referred to as the chemical oxygen demand (COD) and/or biological oxygen demand (BOD). When used prior to seconary treatment the present invention greatly minimizes the COD/BOD treatment requirements in secondary treatment of sewage. With some wastes the present process will give organics and TSS removal sufficient to meet govenmental effluent standards.

The flocculating compositions of the present invention comprises PSA and/or PAS, and usually a smaller amount of CSN. PSA and PAS give substantially the same results and so can be used together or interchangeably. Ferric compound and clay such as bentonire often are desirable. On a dry weight basis the preferred flocculating compositions comprise 1 to 80% CSN; 1 to 80% PSA and/or PAS and 0 to 90% clay and 0 to 90% ferric compound. Preferably the compositions contain at least 50% clay when ferric compound is near 0%.

When ferric compound is near 0%, the CSN is normally in dilute aqueous solution of a non-toxic acid. The CSN and ferric compounds may be pre-mixed and pre-dissolved before adding to the contaminated aqueous media. Alternatively, they may be added individually, the flocculating composition preferably contains at least 50% clay. When added individually, there is some importance in the order of addition as is hereinafter described.

As a generalization it is preferred to add the PSA and/or PAS to the contaminated aqueous medium before ferric compound addition. It is also preferred to add the ferric compound before or simultaneously with the CSN. It has been found that by adding in such preferred sequences better treatment is achieved, particularly with respect to TSS removal and so improved clarity of the treated water.

Several series of tests were run, as set forth in the following examples, to show the excellent effectiveness of the flocculating composition, containing PSA or PAS, in removing organics (COD) and turbidity (TSS)

from contaminated municipal sewage treatment plant influent.

In the test procedures of the examples, several waste samples were taken from the New Castle, Del. waste treatment plant influent and either used directly or kept under refrigeration. These contained TSS and dissolved and undisolved organics (COD). The CSN was shrimp-derived material with 81% deacetylation, with a viscosity of 785 cps sold by Vanson Company of Redmond, Wash. A 1% CSN solution in 1% acetic acid was made and diluted with water to 0.1% for these tests. Ferric chloride obtained from the DuPont Company as a 30% aqueous solution was diluted to 1%. Polysilisic acid was obtained by deionization of sodium silicate solution as a 1% solution, used as such or diluted to 0.1%. Poly aluminosilicate (PAS) solution was made by dissolving 0.432 g sodium aluminate (31% $Na_2O$, 40% $Al_2O_3$) in 45 mL of water and adding 5 mL of 1% PAS aqueous solution. Deartek[198] 2421 polyacrylic acid (AN) anionic polymer was used as a 0.01% water solution.

In each of the tests 100 mL waste water samples were stirred magnetically and the reagents were added in the order left-to-right in the Tables. Two minute mixing time was allowed between each reagent addition. After the final reagent was added to a sample, it was stirred for another 2 minutes. The floc which formed was allowed to settle for 5 minutes, which was sufficient time for a clear separation between the floc and clear supernatant. Liquid was then withdrawn from just below the surface of the samples and analyzed. Turbidity was measured using a Million Roy mini 20 spectrometer with nephalometer attachment. COD was measured using Bioscience Management COD twistubes having a 0–150 mg/L range and measuring spectromatic absorption of samples at 440 nm. Where necessary, the samples were diluted to fall within equipment range and the actual COD determined by the required multiplier. Potassium biphtlalate standards were used for calibration.

EXAMPLE 1

These tests were run to determine the effect of ingredients alone and in various mixtures on turbidity.

| Test # | $FeCl_3$ ppm. | CSN ppm. | PSA ppm. | Turbidity (NTU) |
|---|---|---|---|---|
| 1 |  | 1 |  | 42 |
| 2 | 50 |  |  | 28 |
| 3 | 50 | 1 |  | 15 |
| 4 | 50 | 1 | 5 | 7 |
| 5 | 80 | 1 |  | 11 |
| 6 | 80 | 1 | 5 | 5 |
| Control | 0 | 0 | 0 | 42 |

Test #1 shows no effect on turbidity by CSN alone; a turbidity of 42 NTU. Test 2 shows $FeCl_3$ alone to decrease the turbidity to 28 NTU; whereas test 3 shows that the addition along with the $FeCl_3$, of 1 ppm CSN (which alone is ineffective) improves the turbidity significantly to 15 NTU. Here CSN/$FeCl_3$ clearly act synergetically since ineffective CSN greatly improves the anti-turbidity effect of $FeCl_3$.

Most importantly tests 3, 4, 5 and 6 show the superiority of the present invention versus turbidity. Tests 4 and 6, where a minor amount (5 ppm) of PSA is added to the $FeCl_3$/CSN of tests 3 and 5, show greater than a 50% improvement in anti-turbidity effect is brought about by the inclusion of the PSA.

EXAMPLE 2

Following the procedure outlined above, another series of tests was run to optimize ingredient quantities for anti-turbidity (clarity) treatment of this municipal waste water. The untreated waste water test sample had a turbidity of 42 NTU. The following table sets forth these tests, with the addition order again being left-to-right.

TABLE II

| Test # | $FeCl_3$ ppm. | CSN ppm. | PSA ppm. | NTU | Reduction, % |
|---|---|---|---|---|---|
| 7 | 50 | 1 |  | 15 | 64 |
| 8 | 50 | 1 | 5 | 7 | 83 |
| 9 | 50 | 2 |  | 17 | 60 |
| 10 | 50 | 2 | 5 | 8 | 81 |
| 11 | 50 | 4 |  | 20 | 52 |
| 12 | 50 | 4 | 5 | 11 | 74 |
| 13 | 50 | 8 |  | 21 | 50 |
| 14 | 50 | 8 | 5 | 17 | 59 |
| 15 | 50 |  |  | 28 | 33 |
| 16 | 20 | 1 |  | 36 | 14 |
| 17 | 20 | 1 | 5 | 30 | 29 |
| 18 | 40 | 1 |  | 26 | 38 |
| 19 | 40 | 1 | 5 | 22 | 48 |
| 20 | 80 | 1 |  | 11 | 74 |
| 21 | 80 | 1 | 5 | 5 | 88 |
| 22 | 160 | 1 |  | 11 | 74 |

These results show that the clarity of the treated water improved as the $FeCl_3$ increased. With 50 ppm $FeCl_3$ the clarity reached an optimum at about 1–2 ppm CSN. In all cases, the inclusion in the $FeCl_3$/CSN flocculent of PSA very significantly improved clarity (reduced turbidity) of the treated water. At 50 ppm $FeCl_3$ and 1 and 2 ppm CSN (Tests 8 and 10), 5 ppm PSA decreased the turbidity by about 50% NTU as compared to Tests 7 and 9 where the PSA was omitted. Thus, the present invention compositions containing PSA (or PAS as will appear below) are vastly superior in turbidity control as compared with $FeCl_3$/CSN.

EXAMPLE 3

Following the procedures outlined above, another series of tests were run to establish the substantial equivalence of PSA and PAS in the practice of the present invention.

TABLE III

These tests show that PSA and PAS are substantially equivalents.

| Test # | PAS ppm. | PSA ppm. | $FeCl_3$ ppm. | CSN ppm. | NTU | Reduction % |
|---|---|---|---|---|---|---|
| 22 |  | 5 | 160 | 1 | 4 | 98 |
| 23 |  | 5 | 80 | 1 | 5 | 88 |
| 24 |  | 10 | 80 | 1 | 6 | 86 |
| 25 |  | 20 | 80 | 1 | 4 | 90 |
| 26 |  | 40 | 80 | 1 | 8 | 81 |
| 27 | 5 |  | 160 | 1 | 6 | 86 |
| 28 | 5 |  | 80 | 1 | 7 | 83 |
| 29 | 10 |  | 80 | 1 | 5 | 88 |
| 30 | 20 |  | 80 | 1 | 5 | 88 |
| 31 | 40 |  | 80 | 1 | 4 | 90 |

EXAMPLE 4

Following the procedure in Example 1, a series of tests was run to determine the effectiveness of the present flocculating compositions in reducing organic matter. The procedures outlined above were followed. The untreated waste contained dissolved and undisolved organics and had a COD of 206; additions were made left-to-right in the table. Deartek ™ 2421 anionic polymer (AN) was added in some of the tests.

TABLE IV

| Test # | PSA ppm. | FeCl3 ppm | CSN ppm. | PSA | AN | (NTU) NTU | COD | Reduction % |
|---|---|---|---|---|---|---|---|---|
| 32 | | 50 | 1 | 10 | | 7 | 129 | 37 |
| 33 | | 100 | 2 | 10 | | 5 | 151 | 26 |
| 34 | | 150 | 3 | 10 | | 6 | 111 | 46 |
| 35 | | 100 | 2 | 10 | | 3 | 149 | 27 |
| 36 | 65 | | 4 | | 1 | 1 | 84 | 59 |
| 37 | 10 | | 4 | | 1 | 2 | 88 | 57 |
| 38 | 10 | | 2 | | 1 | 2 | 88 | 57 |
| 39 | 20 | | 2 | | | 4 | 87 | 57 |
| 40 | 10 | | 2 | | | 2 | 2 | 113 |
| 45 | | | | | | | | |

It is clear that adding PSA before rather than after FeCl3 and CSN improves the COD (organics) reduction. AN (Deartek ™ 2421 anionic polymer) greatly increased the floc size and settling rate, but it did not materially effect COD reduction. These results indicate that higher levels of PSA may be advantageous in combination with the higher CSN levels. This may play a significant role in sludge dehydrating.

EXAMPLE 5

The following tests were performed on the same waste water as in Example IV (after 48 hours storage under refrigeration). This waste water contained 4.5 ppm phosphate.

TABLE V

| Test # | PSA ppm. | FeCl3 ppm | CSN ppm. | AN ppm | COD | Reduction % | PO4—* |
|---|---|---|---|---|---|---|---|
| 41 | 60 | 200 | 4 | | 80 | 61 | 0.2 |
| 42 | 120 | 100 | 4 | | 86 | 58 | — |
| 43 | 60 | 50 | 8 | | 97 | 53 | 0.2 |
| 44 | 30 | 50 | 4 | | 93 | 55 | — |
| 45 | 60 | 100 | 2 | 1 | 83 | 60 | — |
| 46 | 65 | 100 | 4 | 1 | 84 | 59 | 0.1 |

*Phosphate was analyzed by color development using molybdenum blue indicator as detailed in standard methods for waste water analysis.

These tests indicate that COD reductions of 60% can routinely be obtained using reasonable levels of PSA, CSN and FeCl3. Tests decreasing waste water COD as much as 78% have been carried out. Phosphate was reduced more than 95 %.

EXAMPLE 6

Following the procedure outlined above, another series of tests was done to determine the effectiveness of the method using compositions containing no ferric compound. The aqueous medium used in these tests was poultry processing waste water containing blood.

TABLE VI

| Test # | PSA ppm | Clay* ppm | CSN ppm | AN | COD** | Reduction % |
|---|---|---|---|---|---|---|
| 1(control) | 0 | 0 | 0 | 0 | 1385 | — |
| 2 | 0 | 0 | 0 | 0.2 | 1315 | 5 |

TABLE VI-continued

| Test # | PSA ppm | Clay* ppm | CSN ppm | AN | COD** | Reduction % |
|---|---|---|---|---|---|---|
| 3 | 7.5 | 0 | 0 | 0 | 1170 | 16 |
| 4 | 0 | 60 | 0 | 0.2 | 965 | 30 |
| 5 | 0 | 0 | 7.5 | 0.1 | 1138 | 18 |
| 6 | 0 | 60 | 7.5 | 0.1 | 867 | 37 |
| 7 | 7.5 | 60 | 7.5 | 0.1 | 345 | 75 |

*Bentonite
**After treatment

The above tests 1–46 show that the present process of flocculating using PSA and/or its equivalent PAS along with a ferric compound and chitosan is for more effected in removing the major impurities from sewage (COD, TSS and phosphate) than using only FeCl3 and CSN.

Not only are this method and these flocculent compositions highly effective in purifying sewage, but also tests have shown that they are effective in treating waste water streams containing blood along with other meat preparation wastes. Also they are effective in treating many industrial waste streams.

What is claimed:

1. A process for removing organic contaminants and turbidity from aqueous media, the process comprising
   (1) adding to an aqueous medium comprising an organic contaminant and turbidity a flocculating composition comprising, on a dry weight basis, at least about 1 ppm chitosan, at least about 20 ppm soluble ferric compound, and least about 5 ppm of polysilicic acid and/or clay poly aluminosilicate;
   the additives being added in an amount sufficient to flocculate the organic contaminant and turbidity and form a flocculate comprising the organic contaminant and turbidity; and
   (2) separating the flocculate from the aqueous medium.

2. The process of claim 1 in which the flocculating composition additionally comprises an anionic polymer.

3. The process of claim 1 in which the flocculating composition comprises clay.

4. The process of claim 1 in which the ferric compound is ferric chloride.

5. The process of claim 1 in which the flocculating composition comprises about 50 ppm ferric chloride and about 1–2 ppm chitosan.

6. The process of claim 1 in which the flocculating composition comprises about 5 ppm polysilicic acid.

* * * * *